(12) United States Patent
Belanger et al.

(10) Patent No.: US 11,127,324 B2
(45) Date of Patent: Sep. 21, 2021

(54) ILLUMINATED SIGN

(71) Applicant: WashMe Properties, LLC, Northville, MI (US)

(72) Inventors: Michael J. Belanger, Northville, MI (US); Curtis S. Prater, Warren, MI (US); Jerry A. Kotrych, Livonia, MI (US)

(73) Assignee: Balanger, Inc., Northville, MI (US)

( * ) Notice: Subject to any disclaimer, the term of this patent is extended or adjusted under 35 U.S.C. 154(b) by 0 days.

(21) Appl. No.: 16/352,369

(22) Filed: Mar. 13, 2019

(65) Prior Publication Data
US 2019/0213927 A1    Jul. 11, 2019

Related U.S. Application Data

(63) Continuation of application No. 14/691,614, filed on Apr. 21, 2015, now Pat. No. 10,276,072, which is a
(Continued)

(51) Int. Cl.
*G09F 13/04*     (2006.01)
*G09F 13/22*     (2006.01)
(Continued)

(52) U.S. Cl.
CPC ............ *G09F 13/22* (2013.01); *G09F 13/005* (2013.01); *B60S 3/04* (2013.01); *G09F 7/22* (2013.01);
(Continued)

(58) Field of Classification Search
CPC ............ B60S 3/004; G09F 2013/0431; G09F 13/0431
(Continued)

(56) References Cited

U.S. PATENT DOCUMENTS 2,818,668 A    1/1958   Bruner
5,237,765 A *  8/1993   Vargish, II ............. G09F 13/26
                                                          40/545
(Continued)

FOREIGN PATENT DOCUMENTS

DE    19950596 A1    5/2001

OTHER PUBLICATIONS

European Office Action from the European Patent Office for European Application No. 17712403.9 dated Apr. 6, 2020, 5 pages.
(Continued)

*Primary Examiner* — Kristina N Junge
(74) *Attorney, Agent, or Firm* — Dickinson Wright, PLLC

(57) ABSTRACT

An illuminated sign for use in a vehicle wash system, including a base, an upright member extending from the base and having an upper portion and a lower portion, and a head portion connected to the upper portion of the upright member. The illuminated sign includes at least one light source having a first mode and a second mode. The first mode is associated with a first group of vehicle wash services for treating an exterior of a vehicle. The second mode is associated with a second group of vehicle wash services for treating an exterior of a vehicle. The sign includes a sign controller in communication with the at least one light source. The sign controller is configured to enable the first mode in response to detecting a selection of the first group of vehicle wash services. The sign controller is also configured to enable the second mode in response to detecting a selection of the second group of vehicle wash services.

17 Claims, 6 Drawing Sheets

Related U.S. Application Data continuation-in-part of application No. 14/687,704, filed on Apr. 15, 2015, now Pat. No. 10,155,503.

(60) Provisional application No. 62/045,208, filed on Sep. 3, 2014.

(51) Int. Cl.
| | |
|---|---|
| *G09F 13/00* | (2006.01) |
| *B60S 3/04* | (2006.01) |
| *G09F 7/22* | (2006.01) |
| *G09F 13/08* | (2006.01) |
| *G09F 19/22* | (2006.01) |
| *G09F 7/18* | (2006.01) |

(52) U.S. Cl.
CPC .......... *G09F 13/0431* (2021.05); *G09F 13/08* (2013.01); *G09F 19/22* (2013.01); *G09F 2007/1804* (2013.01); *G09F 2013/222* (2013.01)

(58) Field of Classification Search
USPC .................. 40/544, 553, 581, 555, 541, 586
See application file for complete search history.

(56) References Cited

U.S. PATENT DOCUMENTS

| | | |
|---|---|---|
| 6,871,103 B2 | 3/2005 | Van Kesselke |
| 7,824,074 B2 | 11/2010 | Liou et al. |
| 8,539,968 B2 | 9/2013 | Turner et al. |
| 2004/0083633 A1 | 5/2004 | Mueller |
| 2007/0291473 A1 | 12/2007 | Traynor |
| 2008/0016734 A1 | 1/2008 | Basha |
| 2008/0236006 A1 | 10/2008 | Chadwell et al. |
| 2009/0072165 A1* | 3/2009 | Townsend ................. F21S 4/26 250/504 R |
| 2011/0119968 A1 | 5/2011 | Buddenhagen et al. |
| 2011/0197935 A1 | 8/2011 | Belanger |
| 2011/0277792 A1 | 11/2011 | Turner et al. |
| 2011/0277797 A1 | 11/2011 | Turner et al. |
| 2011/0314711 A1 | 12/2011 | Jumblatt et al. |
| 2012/0204455 A1 | 8/2012 | Mothaffar |
| 2014/0223676 A1 | 8/2014 | Belanger et al. |
| 2015/0274134 A1 | 10/2015 | Turner et al. |
| 2016/0059831 A1 | 3/2016 | Belanger et al. |

OTHER PUBLICATIONS

European International Search Report dated Nov. 16, 2015.

Australian Examination Report No. 1 for Standard Patent Application dated Jun. 21, 2018 and Australian Examination Report No. 1 for Standard Patent Application dated Jul. 19, 2018.

* cited by examiner

ILLUMINATED SIGN

CROSS-REFERENCE TO RELATED APPLICATIONS

The present application is a continuation of U.S. Utility patent application Ser. No. 14/691,614 entitled "Illuminated Sign", filed on Apr. 21, 2015, which claims priority to U.S. patent application Ser. No. 14/687,704, entitled "Vehicle Wash Package Selection Confirmation System", filed on Apr. 15, 2015, which claims priority to U.S. Provisional Patent Application Ser. No. 62/045,208 entitled "Vehicle Wash Package Selection Confirmation System", filed Sep. 3, 2014, the disclosures of which are hereby incorporated by reference as though set forth fully herein.

TECHNICAL FIELD

The present disclosure relates generally to an illuminated sign that identifies different subsets of services. More specifically, the present disclosure relates to an illuminated sign that communicates different groupings of vehicle wash services as they are implemented through the display of different colored lights.

BACKGROUND OF THE INVENTION

Vehicle wash systems have become a common way for vehicle owners to quickly and efficiently have their vehicles cleaned without having to wash and clean them by hand. Depending upon how dirty the vehicle is, the level of cleanliness the vehicle owner seeks to achieve, and the amount of money the vehicle owner is willing to spend, there are a variety of different types of vehicle wash systems with different service options available to meet those needs. For example, full service vehicle wash systems provide vehicle operators with both interior and exterior vehicle cleaning services. These are generally the most expensive type of vehicle wash systems. Self-service type vehicle wash systems offer vehicle owners a less expensive option for cleaning their vehicles. However, with these types of systems, vehicle owners must operate the equipment themselves to clean the interior and/or exterior of their vehicles. The most common type of vehicle wash systems are those that offer exterior vehicle cleaning services only and which are often embodied as conveyerized tunnel systems or roll over machines. In terms of price, these last type of vehicle wash systems are generally priced in between the other two types of vehicle wash systems.

Each of the above-described vehicle wash systems typically presents vehicle owners with a variety of different cleaning and treatment options and services for varying fees. For example, most vehicle wash systems (whether full service or conventional) generally offer vehicle owners a basic wash package that consists of treating a vehicle exterior with conventional cleaning services. This basic wash package is generally provided for a base fee and is often referred to as a regular or base wash. For customers that want additional treatments or services to be performed on their vehicle, many vehicle wash systems offer an upgraded package that includes additional services for payment of an increased fee, such as an under body wash or a tire shine. Other customers may want the "works" and many vehicle wash systems offer a still further upgraded package which includes all of its premium services. The additional services in these upgraded packages, which are often referred to as premium packages, can include an under body rust inhibitor or a tire polish. The premium packages are generally available at a fee that is higher than any of the other packages available.

Once a vehicle owner makes a selection of a desired package and pays the appropriate fee, he relies on the operator of the vehicle wash system to implement the appropriate package that the vehicle owner paid for. However, it is not uncommon for a vehicle owner to select and pay for one package and have the wash system provide a different package. This can occur through inadvertent entry of the package selection into the controller by a wash owner/operator or improper intent on the part of the operator of or worker at the vehicle wash system to pocket the difference between the package paid for and that provided.

Additionally, this discrepancy often goes uncorrected as vehicle owners would have a very difficult time noticing this error during the vehicle wash process, even if they know what to look for. This is because the environment within a vehicle wash facility is generally dark with little light and thus visibility for vehicle owners is usually very poor. Couple this with the fact that the vehicle windows are usually covered with soap and water during the vehicle wash process and it is very difficult for vehicle owners to see what components are actually treating their vehicle. As this practice is known to occur and it is difficult to rectify after the fact, some vehicle owners are dissuaded from purchasing packages with additional services for fear that those services will not be provided. This has resulted in a significant loss of revenue for the car wash industry.

It is also known that lighted signs are utilized in the vehicle wash industry as well as other industries for advertising purposes and to communicate discrete information through the use of lettering indicia. These lighted signs only communicate information statically as they communicate unitary pre-programmed information. For example, in the vehicle wash industries, lighted signs are used to communicate that a particular service is being provided. Specifically, some vehicle wash systems employ a sign adjacent a hot wax system, which will light up to illuminate the name of the hot wax chemical provider when hot wax service is being applied to a vehicle. Conversely, if the hot wax service is not being performed, the sign is not illuminated. These signs thus are only capable of communicating very limited information.

It would thus be desirable to provide a method and system that overcomes these disadvantages and limitations with existing vehicle wash systems and lighted signs.

SUMMARY OF THE INVENTION

It is therefore an aspect of the present disclosure to provide a vehicle wash system that provides a higher quality wash service for vehicle owners.

It is another aspect of the present disclosure to provide a vehicle wash system that is more attractive to customers and prospective customers.

It is still another aspect of the present disclosure to provide an illuminated sign that can communicate different groupings of services based on different colors.

It is yet another aspect of the present disclosure to provide an illuminated sign for use in a vehicle wash facility which has different modes each corresponding to a separate vehicle wash service.

It is a further aspect of the present disclosure to provide a vehicle wash system that provides a perception of high quality to customers and prospective customers.

It is still a further aspect of the present disclosure to provide a vehicle wash system that provides a more enjoyable vehicle wash experience for customers.

It is still yet another aspect of the present disclosure to provide a vehicle wash system that provides visual confirmation to vehicle occupants that the wash system is providing the services the vehicle owner selected and paid for as part of the wash process.

It is still yet a further aspect of the present disclosure to provide a vehicle wash system that yields improved aesthetics within a vehicle wash facility.

It is yet another aspect of the present disclosure to provide a vehicle wash system that provides improved diagnostic information to a vehicle wash operator to facilitate efficient operation of the system.

It is still yet another aspect of the present disclosure to provide a vehicle wash system that can assist in increased revenue generation.

It is still yet a further aspect of the present disclosure to provide a vehicle wash system that can assist with marketing of the vehicle wash facility.

In accordance with the above and the other aspects of the present disclosure, an illuminated sign for use in a vehicle wash system is provided. The sign includes a base and an upright member extending from the base. The sign also includes a head portion which is connected to an upper portion of the upright member. At least one light source is disposed on the sign. The at least one light source has a first mode and a second mode. The first mode is associated with a first group of vehicle wash services for treating an exterior of a vehicle. The second mode is associated with a second group of vehicle wash services for treating an exterior of a vehicle. A sign controller is in communication with the at least one light source with the sign controller being configured to enable the first mode in response to a selection of the first group of vehicle wash services and configured to enable the second mode in response to a selection of the second group of vehicle wash services.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE DISCLOSURE

Figure 1:
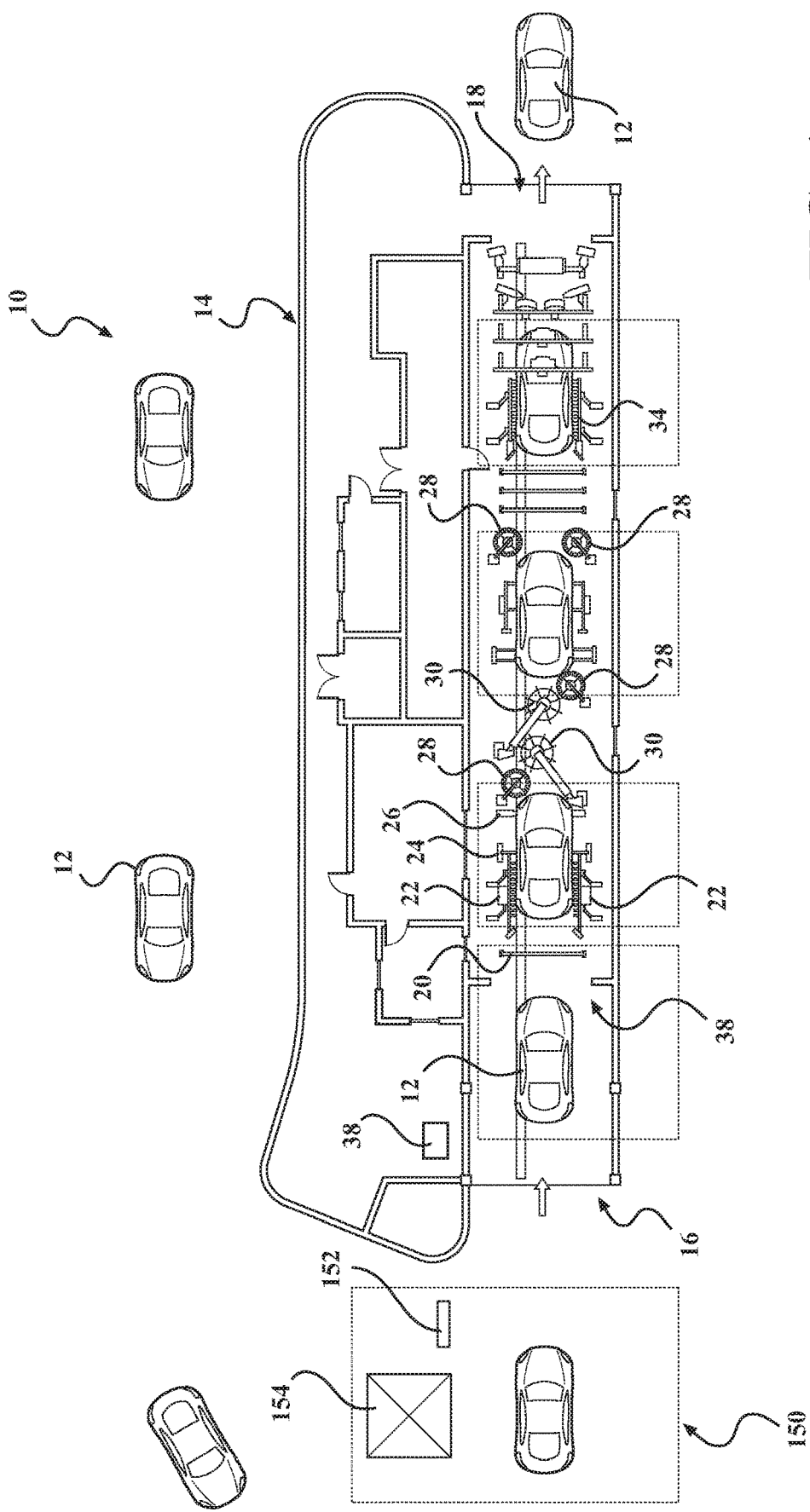
FIG. 1 is a schematic illustration of a vehicle wash system having a plurality of vehicle wash components in accordance with an aspect of the disclosure.
Figure 3:
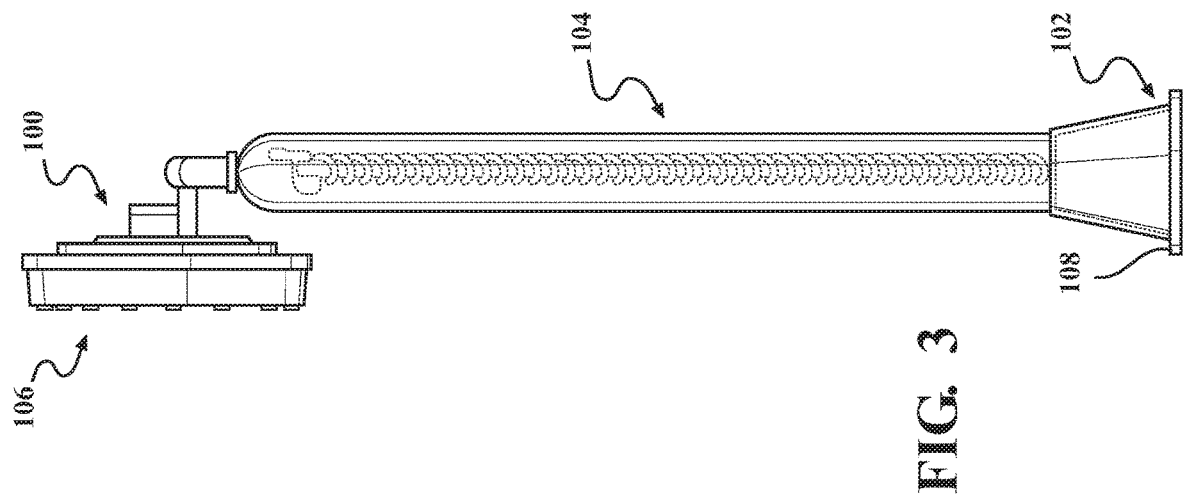
FIG. 3 is a side view of the illuminated sign of FIG. 2.
Figure 2:
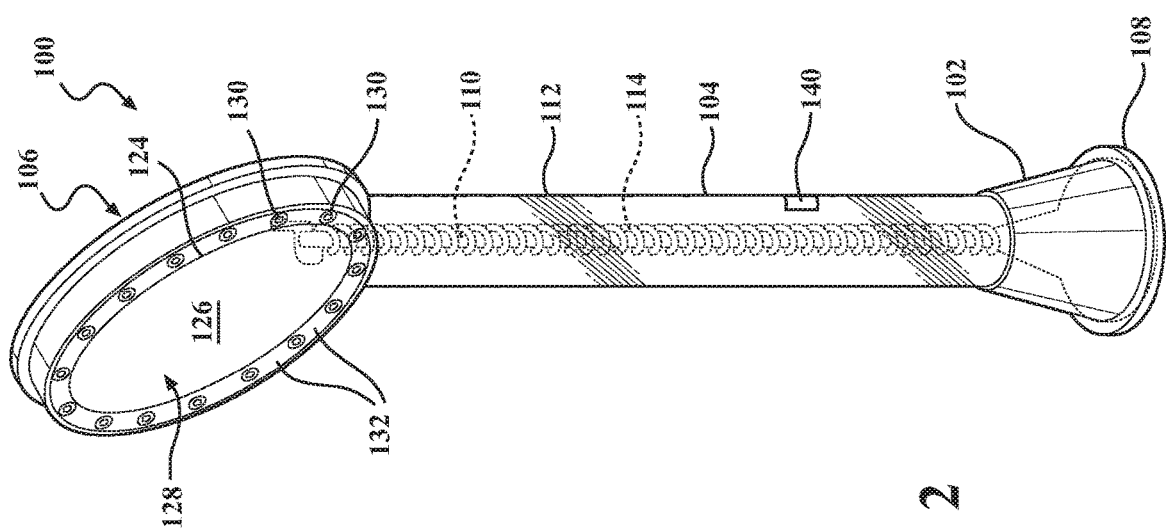
FIG. 2 is a perspective view of an illuminated sign for a vehicle wash system in accordance with an aspect of the disclosure.
Figure 5:
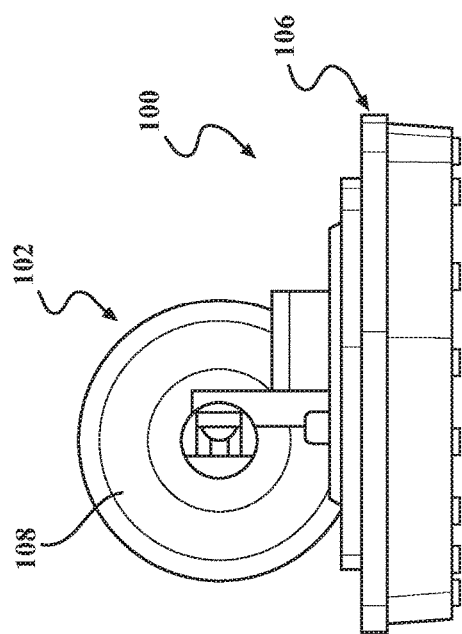
FIG. 5 is a top view of the illuminated sign of FIG. 2.
Figure 4:
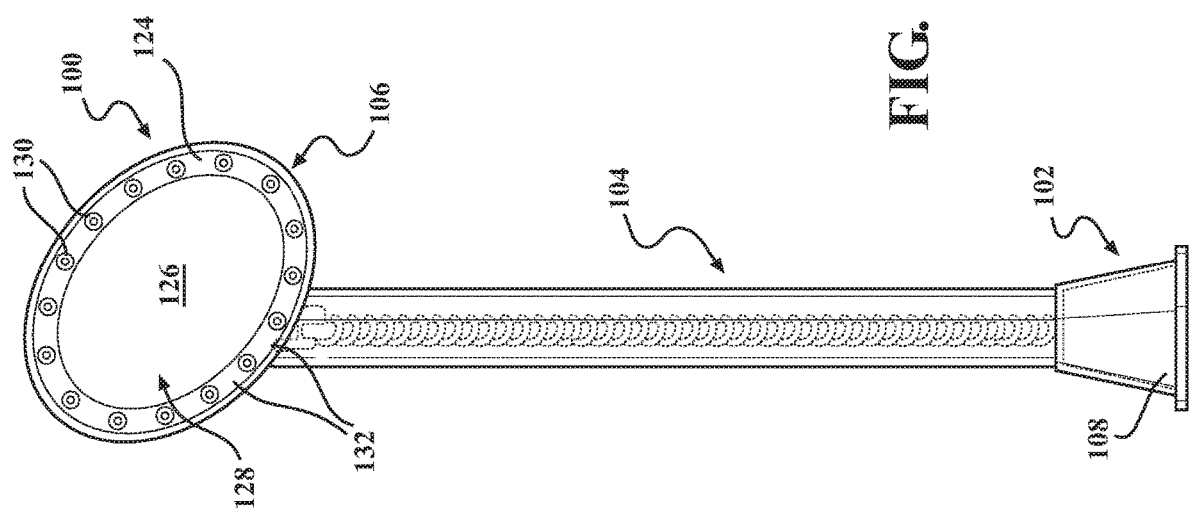
FIG. 4 is a front view of the illuminated sign of FIG. 2.
Figure 6:
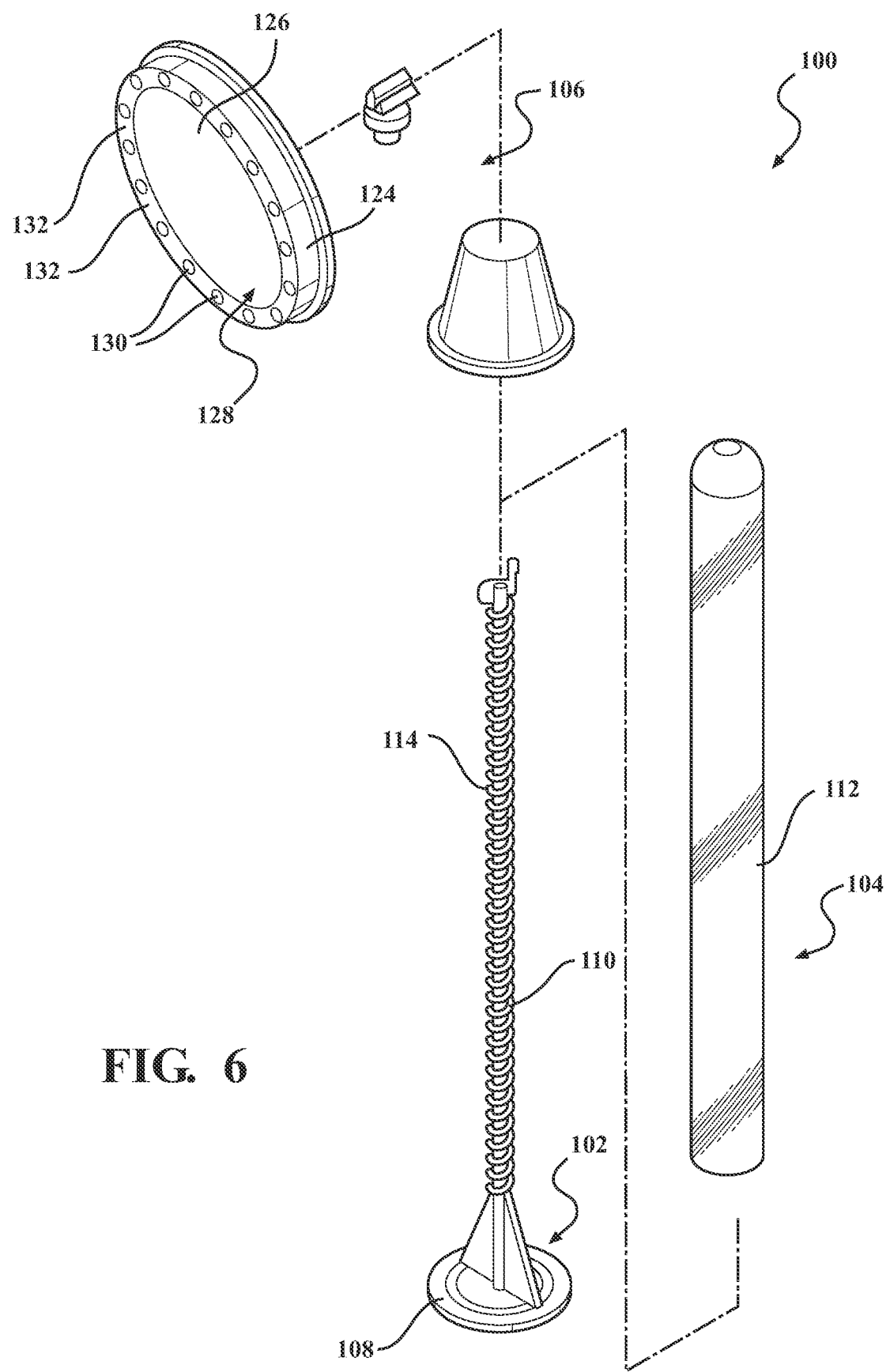
FIG. 6 is an exploded view of the illuminated sign of FIG. 2.

According to an aspect, the present disclosure relates to a vehicle wash system 10. As shown in FIG. 1, the system 10 may be configured as a tunnel car wash, where a vehicle 12 is conveyed through the wash process by a conveyor or the like as is known in the art. Alternatively, the vehicle wash system 10 may be configured as a roll-over type where the vehicle 12 remains stationary and wash components move with respect to the vehicle 12 to perform the vehicle wash process. Other suitable wash processes and systems may also be employed. It will be appreciated that the disclosed system could also be employed in connection with a variety of other vehicle wash systems including, full service, manual or self-serve wash processes.

According to an aspect, the vehicle wash system 10 may be housed within a vehicle wash facility 14 having an entrance end 16 where a vehicle enters and an exit end 18 where the vehicle leaves. According to a further aspect, the vehicle wash system 10 may also include a variety of vehicle wash components that engage and/or treat the exterior of the vehicle 12 as it passes through the vehicle wash facility 14 to effectuate the vehicle wash process. For example, as illustratively shown in FIG. 1, the vehicle wash system 10 can include a rinse arch 20, which sprays water onto the vehicle. The system 10 can also include a pair of wheel scrubbers 22 for cleaning vehicle wheels as well as the lower portion of a vehicle. Additionally, the system 10 may include a top wheel or brush 24 for cleaning an upper exterior surface of a vehicle. Moreover, the system 10 can also include a bubble or foam delivery device 26 that generates bubbles and emits them directly onto the vehicle exterior.

According to another aspect, the system 10 can include one or more side brushes 28 for contacting side exterior surfaces of a vehicle and a plurality of wrap brushes 30 for contacting both front and back vehicle surfaces. The system 10 can also include a drying section 32 for removing water from the vehicle exterior. According to a further aspect, the system 10 can include a wheel polishing device 34. It will be appreciated that more, less or different wash components may be employed as part of the vehicle wash system. For example, the system 10 may also include components for treating the vehicle undercarriage, for applying body sealant, for applying polish wax to the vehicle and/or performing a variety of different functions. Additionally, multiples of the same components may be employed as part of the system as desired. Further, the components may take on a variety of different configurations. Moreover, the order, placement and sequence of the components within the system 10 may also vary. According to an aspect, the components may be designed to engage and/or treat the vehicle 12 as it is disposed within a vehicle treatment area 36 of the vehicle wash facility 14.

According to an aspect, the vehicle wash system 10 may include a controller 38 that is in communication with all of the treatment components so that the system 10 may operate automatically under computer control. According to another aspect, the controller 38 may be employed to direct the operation and timing of the vehicle wash components. For example, the controller 38 could signal certain vehicle components to start operating as a vehicle approaches and then signal them to shut down after the vehicle has passed. It will be appreciated that the vehicle wash system 10 could include a variety of sensors or sensing devices to track the location of the vehicles within the system and communicate that information to the controller 38. It will also be appreciated that a computer, processor or other suitable control device may alternatively be employed to control the system and its components. According to further aspect, each of the vehicle wash components, i.e., 20, 22, 24, 26, 28, 30, 32 and 34 utilized in the vehicle wash system 10 can include a light source associated therewith. Exemplary lighted vehicle wash components are described in Applicants' co-pending U.S. patent application Ser. No. 14/474,817, entitled "Lighted Vehicle Wash Component", which was filed on Sep. 2, 2014 and Applicant's co-pending U.S. patent application Ser. No. 14/456,636, entitled "Lighted Vehicle Wash Component", which was filed on Aug. 11, 2014, the disclosures of which are hereby incorporated by reference as though set forth fully herein.

FIGS. 2 through 6 illustrate a lighted sign component 100 for use in connection with a vehicle wash system 10 according to an aspect of the present disclosure. According to an aspect, the lighted sign component 100 can include a base portion 102, a mounting portion 104, and a display portion 106. According to an aspect, the base portion 102 may have a flat baseplate portion 108 for engaging a flat structure such as ground of a vehicle wash facility. It will be appreciated that the baseplate portion 108 could be configured to engage a variety of other suitable structures. It will also be appreciated that the lighted sign component 100 could be located in a variety of suitable locations throughout the vehicle wash facility. According to an aspect, the lighted sign component 100 may be located adjacent the entrance end 16 of the wash facility. It will further be appreciated that the baseplate portion 108 could have a variety of different configurations.

According to another aspect, the mounting portion 104 may be configured as a vertical post that may extend generally between the base portion 102 and the display portion 106. According to aspect, the mounting portion 104 may include a signpost portion 110 and a cover portion 112 that may be disposed over the signpost portion 110. According to an aspect, the cover portion 112 may be constructed of a translucent material. It will be appreciated that the cover portion 112 could be constructed of a variety of other suitable materials such as an opaque or transparent material. According to a further aspect, an light source 114 may be in communication with the signpost portion 110 such that light may be emitted through the cover portion 112 and may be visible from the exterior of the component 100. The light source 114 may be configured as a flexible LED strip that is wrapped around the signpost portion 110. It will be appreciated that a variety of other types of suitable light sources may be employed and that they may be mounted or disposed within the mounting portion 104 in a variety of suitable ways. It will also be appreciated that the mounting portion 104 could have a variety of different configurations. It will be further appreciated that the light sources could be disposed in a variety of other locations on the component 100.

According to a further aspect, the display portion 106 may be pivotally connected to an upper end of the mounting portion 104. As shown, the display portion 106 may have a generally circular shape with an outer peripheral portion 124 and a middle section 126. According to an aspect, the middle section 126 may be constructed of a translucent material such as a translucent plastic material and may be configured to emit light. It will be appreciated that the middle section 126 could be constructed of an opaque material that is configured to glow. According to another aspect, the middle section 126 may be configured to display lighted indicia, such as signage information 128. This may be accomplished by one or more light sources disposed behind the middle section 126 as will be understood by one of ordinary skill in the art. This signage information 128 could be configured as navigational information that is conveyed to a vehicle occupant, including that it is clear for the vehicle to drive forward or that the vehicle needs to stop. The signage information 128 could also be configured as promotional information about services the vehicle wash facility has available for the vehicle, such as the various wash packages. It will be appreciated that the signage information 128 could be configured and utilized to convey a variety of other suitable information. It will also be appreciated that the middle section 126 could also be constructed of a translucent or transparent material.

According to yet another aspect, the outer peripheral portion 124 may include individual light sources 130 uniformly dispersed therearound to provide additional light that may be emitted from the component 100. The light sources 130 may be individual LEDs. However, a variety of other suitable light sources may be employed. A plurality of sections 132 may be included between the light sources 130 that may also be constructed of translucent material. It will be appreciated that the outer peripheral portion 124, the light sources 130, and the sections 132 may all be colored with the same light at the same time. Alternatively, each portion may be colored with different lights. It will also be appreciated that some or all of the light sources may be configured to flash or blink. It will further be appreciated that the outer peripheral portion 124 could be constructed of a transparent or opaque material.

According to an aspect, the system 10 may be configured to illuminate certain of the treatment components within the facility in selected areas upon certain predetermined conditions or at desired times. According to one exemplary aspect, the system 10 may be configured to illuminate certain of the treatment components and/or light sources located within the vehicle wash facility to provide a vehicle occupant with feedback and confirmation that the wash package that they selected is actually being performed on their vehicle.

Figure 7:
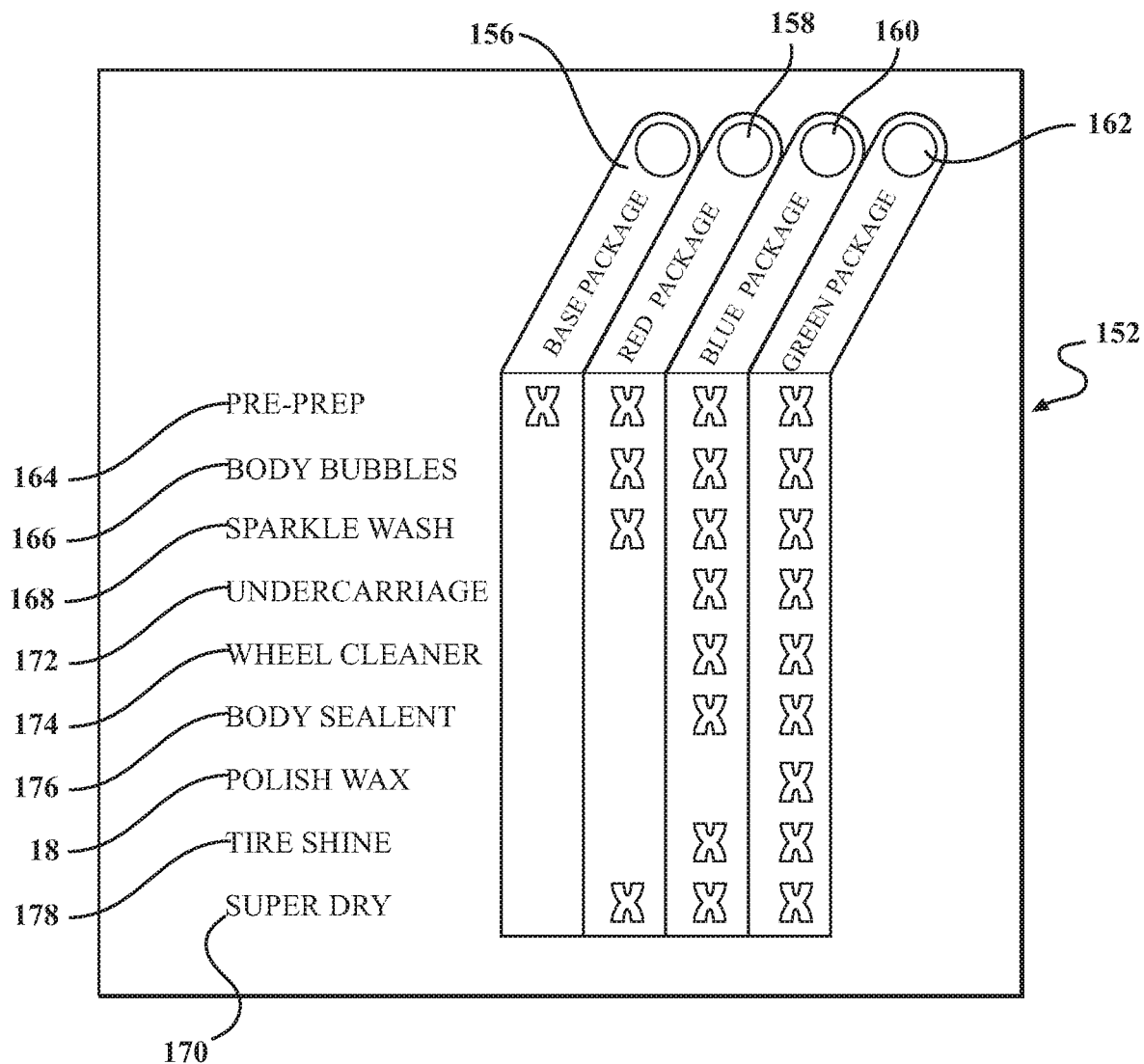
FIG. 7 is an exemplary package menu sign for a vehicle wash system in accordance with an aspect of the disclosure.

In accordance with a method and system of the present disclosure, when a vehicle arrives at the vehicle wash facility, the vehicle can encounter a package purchase zone 150 where a vehicle operator is presented with various treatment packages and associated prices for treatment of the vehicle. The various treatment options may be presented to the vehicle occupant in a variety of different ways. According to one aspect, they may be presented to the vehicle occupant on a display screen, a menu board, or a variety of other suitable ways. An exemplary menu board is schematically depicted in FIG. 7 as reference number 152. Once the vehicle operator has decided which vehicle treatment package to purchase, they may indicate their package selection in a variety of different ways. According to one aspect, the vehicle operator may stop at an operator station, generally designated by reference number 154, and convey their package selection to an operator who will manually input that selection into a computer or controller to start the process. According to another aspect, the vehicle operator may enter their selection electronically such as on an electronic terminal that also allows for electronic selection and payment at that terminal. Once their selection is input, the controller 38 can track that operator's vehicle as it travels throughout the wash process and can direct that the services associated with the package selected by the operator be performed.

With reference to FIG. 7, the disclosed vehicle wash system 10 can offer various treatment packages that are identified by different identifiers and each have different services associated therewith. As discussed above, these may be presented on a menu board or display. According to an aspect, the primary identifier associated with the various treatment packages of the present disclosure may be a color. For example, with reference to FIG. 7, the base package, as generally indicated by reference number 156, may be identified as the White package and may be designated by the color white or no color. The Red package, which includes additional wash services over the White package, is generally indicated by reference number 158, and may be designated by the color red. The Blue package, which includes additional wash services over and above the White package and the Red package, is generally identified by reference number 160, and may be designated by the color blue. The Green package, which can include the most wash services of the various packages available, is generally identified by reference number 162, and may be designated by the color green. It will be appreciated that more or less packages may be presented to vehicle occupants. It will also be appreciated that the various packages can be assigned any color or any other identifier.

According to an aspect and with continued reference to FIG. 7, the services offered with the White package are a standard wash and may include a pre-prep service, which is generally by reference number 164. According to another aspect, with the Red package the vehicle occupant can also get the pre-prep wash 164 along with additional services, including body bubbles, identified generally by reference number 166, sparkle wash, generally identified by reference number 168, and super dry, generally identified by reference number 170. As will be appreciated, the vehicle occupant may elect to purchase the Red package for an additional fee over and above the fee for White package.

Further, with the Blue package, the vehicle occupant may receive additional services in addition to those offered with the Red package, including undercarriage cleaning, generally identified by reference number 172, wheel cleaning services, generally identified by reference number 174, body sealant, generally identified by reference number 176, and tire shine services, generally identified by reference number 178. According to an aspect, the vehicle occupant may purchase the Blue package for a fee that is greater than the Red package.

According to a further aspect, the Green package offers the vehicle occupant the most services. According to an aspect, the Green packages can offer the vehicle occupant all the same services available with the Red package as well as an additional polish wax service, generally identified by reference number 180.

According to an aspect, once the vehicle occupant has selected the color package option and that selection has been entered into and recognized by the computer system, the vehicle wash system 10 can be coordinated such that the color of the light sources associated with the lighted sign component 100 as well as the various treatment components matches the color of the vehicle owner's selected package. In other words, the colors emitted from the light sources may be coordinated with a customer's package purchase. According to an aspect, the controller 38 could also be in communication with the light sources to control their operation and match their color to the color assigned to the selected package option. For example, the controller 38 may control all the light sources in accordance with a DMX protocol. According to another aspect, a separate DMX controller could be utilized to control the lighting of the light sources. The DMX controller could be employed as a laptop. The DMX controller could also include software that allows the controller to accomplish the functionality described herein. The DMX controller could take on a variety of other configurations.

According to an aspect, after the vehicle occupant's package selection purchase has been entered into the system, the vehicle can proceed through the entrance end 16 of the vehicle wash facility 14. According to an aspect, the controller 38 together with the sensors and other devices can track the location of the vehicle within the wash system 10, as is described in detail in Applicant's U.S. patent application Ser. No. 14/687,704 entitled "Vehicle Wash Package Selection Confirmation System", filed Apr. 15, 2015, the disclosure of which is hereby incorporated by reference as though set forth fully herein.

According to an aspect, the controller 38 could be in communication with one or more lighted sign components 100. The system 10 may have one or more lighted sign components 100 disposed at various locations throughout the vehicle wash system. The lighted sign components 100 may include a separate sign controller 140 or other controlling device incorporated therein. It will be appreciated that the sign controller 140 could be located in a variety of different places, including as part of the system controller 38. According to a further aspect, the one or more light sources 114, 130 can each have a plurality of modes. Each of the plurality of modes may be associated with a respective service package offering. For example and with reference to FIG. 7, the one or more light sources 114, 130 could include four different modes. A white mode could correspond to the White package 156. A red mode could correspond to the Red package 158. A blue mode could correspond to the Blue package and a green mode could correspond to the Green package 160.

Figure 8:
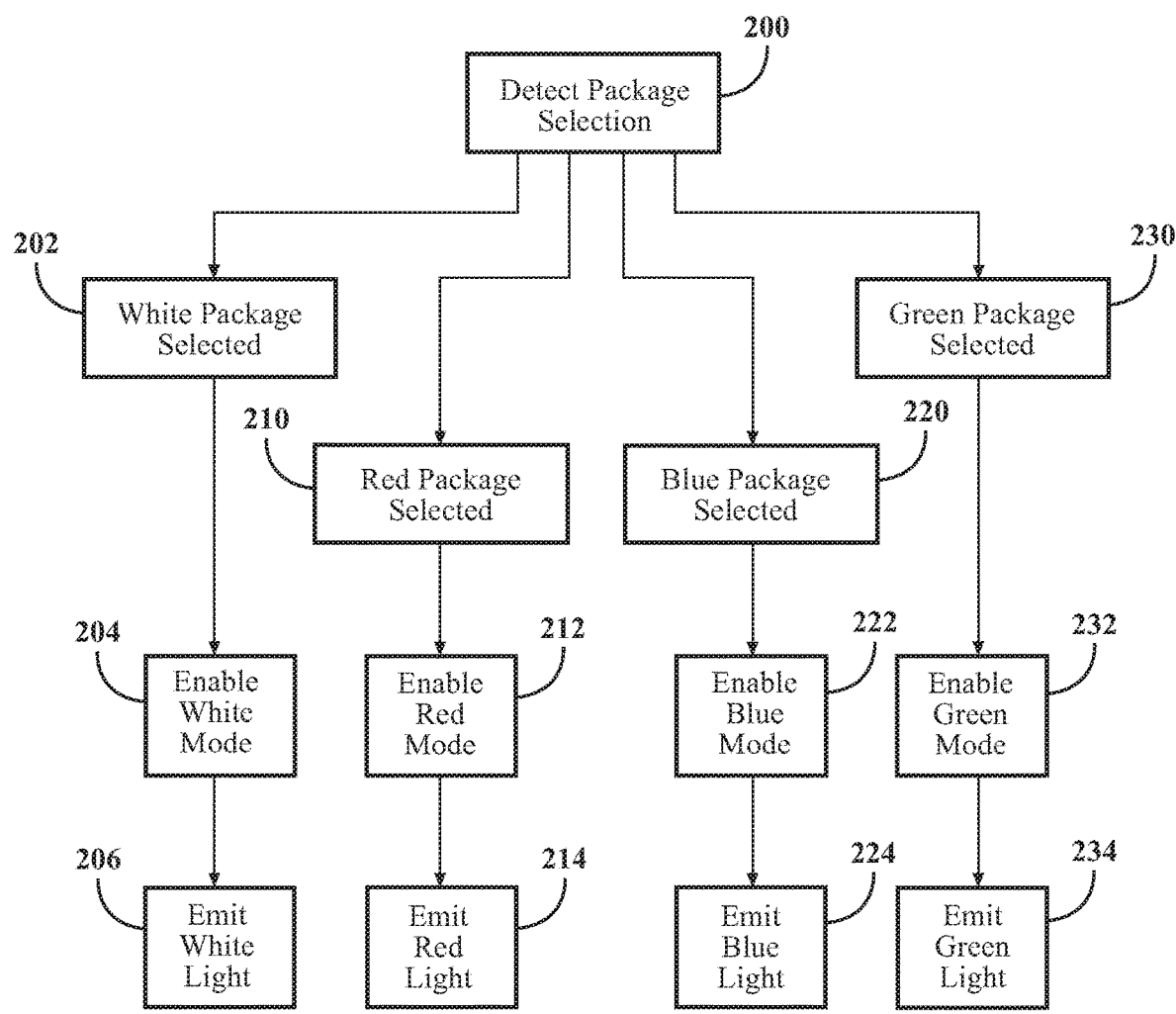
FIG. 8 is a flow chart illustrating a method in accordance with an aspect of the present disclosure.

According to an aspect and with reference to FIG. 8, upon the controller 38 detecting a selection of a vehicle package option, as generally indicated by reference number 200, a respective one of the modes may be enabled. For example, in the event of a selection of the White package 156, as generally indicated by reference number 202, the sign controller 140 may enable the White mode of the light sources 114, 130, as generally indicated by reference number 204. This could involve the light sources emitting a white light or emitting no light at all, as generally indicated by reference number 206. According to another example, in the event of a selection of the Red package 158, as generally indicated by reference number 210, the sign controller 140 can enable the Red mode of the light sources 114, 130, as generally indicated by reference number 212. In the Red mode, the light sources 114, 130 may be colored red to correspond to the package selected, as generally indicated by reference number 214.

According to another aspect, in the event of a selection of the Blue package 160, as generally indicated by reference number 220, the sign controller 140 may enable the Blue mode of the light sources 114, 130, as generally indicated by reference number 222. In this mode, the light sources may emit the color blue, as generally indicated by reference number 224. Additionally, in the event of a selection of the Green package 162, as generally indicated by reference number 230, the sign controller 140 may enable the Green mode of the light sources 114, 130, as generally indicated by reference number 232. In the Green mode, the light sources may be instructed to emit the color green, as generally indicated by reference number 234.

According to another aspect, the system could be configured so that the illumination sources emit colors for useful proposes as opposed to for primarily aesthetic purposes. According to another aspect, the illumination sources could be programmed to emit colors for navigation purposes, such as red when a vehicle operator should stop and green when it is clear for the vehicle to proceed. According to a further aspect, the illumination sources could employ the RGB color model, where red, green, and blue light are added together in various ways to reproduce a broad array of colors, as is known.

According to an aspect, the illumination sources on the sign elements may be configured to separately emit lights of different colors sequentially. According to another aspect, the illumination sources may each be in communication with the controller 38 so that they may be programmed to emit the same color from each of the different sign elements in synchronization or unison. According to another aspect, the controller 38 could be programmed to emit colors in a particular pattern or sequence. For example, the following color sequence could be emitted from each component: blue, followed by red, followed by green, followed by yellow. It will be appreciated that different colors could be emitted from the components in different orders. For example, if the RGB color sequence is employed, an infinite number of colors could be created and emitted from the light sources in a controlled fashion. According to an aspect, controlling light sources such that colored lights from multiple sign elements are emitted in unison or simultaneous provides significant aesthetic benefits. This is compared to each light source being controlled individually where they are not in unison, which can be very distracting.

It will also be appreciated that various combinations of colors or even multiple colors could be emitted from each component at the same time. According to a still further aspect, the controller 38 could be configured to emit different colors from each of different sign elements at the same time. It will be appreciated that any sequence, order or placement of colors may be employed. According to an aspect, emitting different colors from the light sources in a controlled pattern is considered far more attractive then emitting the colors in a random fashion.

According to an aspect of the disclosure, the controller 38 could be configured to vary the pattern of colors utilized within the system at a predetermined time. For example, the controller 38 could be emitted to vary the pattern based on a time trigger, i.e., the pattern could change every hour. According to an aspect, the controller 38 could be configured to change the pattern based on another event, such as the location of a vehicle. The controller 38 could be configured to switch from one pattern to another based on a variety of different events or triggers. According to a further aspect, the controller 38 could be configured to switch from one controlled pattern to another pattern randomly.

In addition to colored patterns, the controller 38 could be configured to create other effects with the lights, including flashing the lights in a pattern. The lights could also be dimmed or have a variety of other effects.

According to another aspect, the sign element may be employed in a variety of different applications to convey information about different groups of services. It will be appreciated that the disclosed sign element could be employed at various retail, commercial or industrial applications.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. A vehicle wash system, comprising:
   a vehicle wash facility including an entrance end and an exit end;
   a plurality of vehicle wash components positioned inside the vehicle wash facility and configured to treat exteriors of passing vehicles;
   an illuminated sign positioned adjacent to the entrance end of the vehicle wash facility;
   the illuminated sign including a display portion for presenting indicia including information for a customer of the vehicle wash facility;
   the illuminated sign further including at least one light source, the at least one light source having at least a first color mode displaying a first color and a second color mode displaying a second color; and
   a controller in communication with the at least one light source and the plurality of vehicle wash components, the controller configured to detect a selection of one of a plurality of groups of vehicle wash services from a user, whereby each of the plurality of groups of vehicle wash services corresponds to a combination of the vehicle wash components being activated and one of the color modes of the at least one light source;
   wherein the controller is configured to enable the selected one of the plurality of groups of vehicle wash services and to enable the one of the color modes corresponding to the selected one of the plurality of groups of vehicle wash services such that the at least one light source emits the color from the at least one light source of the color mode corresponding to the selected one of the plurality of groups of vehicle wash services, and such that the combination of the vehicle wash components that correspond with the selected one of the plurality of groups of vehicle wash services are activated.

2. The vehicle wash system as set forth in claim 1 further including:
an operator station positioned adjacent to the entrance end of the vehicle wash facility and configured to allow the user to select one of the plurality of groups of vehicles wash services.

3. The vehicle wash system as set forth in claim 1 wherein the at least one light source has a third color mode and wherein the third color mode is associated with a third color, and wherein one of the plurality of groups of vehicle wash services is associated with the third color.

4. The vehicle wash system as set forth in claim 1 wherein the display portion has an outer peripheral portion and a middle section, wherein the middle section is of a translucent material, and wherein the display portion is configured to present the indicia on the middle section.

5. The vehicle wash system as set forth in claim 4 wherein the at least one light source further includes an elongated signpost portion supporting the display portion, and a vertical light source connected to the elongated signpost portion.

6. The vehicle wash system as set forth in claim 5 wherein the at least one vertical light source extends along a majority of a length of the signpost portion.

7. The vehicle wash system as set forth in claim 6 wherein the at least one vertical light source is an LED light strip.

8. The vehicle wash system as set forth in claim 7 wherein the at least one vertical light source is wrapped about the signpost portion.

9. The vehicle wash system as set forth in claim 5 wherein the at least one light source further includes at least one peripheral light source positioned adjacent to and following the outer peripheral portion of the display portion and at least one central light source behind the translucent middle section.

10. The vehicle wash system as set forth in claim 5 wherein the illuminated sign further includes an elongated cover portion surrounding the at least one vertical light source, wherein the elongated cover portion is of a translucent material to allow light from the at least one vertical light source to be transmitted through the cover portion.

11. The vehicle wash system as set forth in claim 1 further including at least one lighted component positioned spaced from the illuminated sign in the vehicle wash facility, wherein the at least one lighted component has the first and second color modes, and wherein the at least one lighted component is configured to enable the one of the color modes corresponding to the selected one of the plurality of groups of vehicle wash services such that the at least one lighted component emits the color of the color mode corresponding to the selected one of the plurality of groups of vehicle wash services.

12. The vehicle wash system as set forth in claim 11 wherein the at least one lighted component is incorporated into one of the vehicle wash components of the plurality of vehicle wash components.

13. A vehicle wash system, comprising:
a vehicle wash facility including an entrance end and an exit end;
a plurality of vehicle wash components positioned inside the vehicle wash facility and configured to treat exteriors of passing vehicles;
an operator station positioned adjacent to the entrance end of the vehicle wash facility and configured to allow a user to select one of a plurality of groups of vehicle wash services, wherein each of the groups of vehicle wash services corresponds with a different combination of the vehicle wash components being activated;
an illuminated sign positioned adjacent to the entrance end of the vehicle wash facility and including at least one light source having a plurality of color modes, each of the color modes corresponding to a different color of the at least one light source; and
a controller in communication with the at least one light source and with the plurality of vehicle wash components and with the operator station, the controller configured to detect a selection of one of the plurality of groups of vehicle wash services at the operator station, whereby each of the plurality of groups of vehicle wash services is associated with one of the color modes of the at least one light source;
whereby the controller is further configured to enable one of the plurality of color modes corresponding to the detected vehicle wash service selection such that the at least one light source may emit a color from the at least one light source associated with the selected one of the groups of vehicle wash services, and whereby the controller is further configured to activate the combination of the vehicle wash components that correspond with the selected one of the plurality of groups of vehicle wash services.

14. The vehicle wash system as set forth in claim 13 wherein the illuminated sign includes an elongated signpost portion, a display portion supported by the signpost portion, and wherein the at least one light source includes a vertical light source connected to the elongated signpost portion.

15. The vehicle wash system as set forth in claim 14 further including an elongated cover portion having a tube shape positioned about the elongated signpost portion, and wherein the elongated cover portion is transparent.

16. The vehicle wash system as set forth in claim 14 wherein the display portion has an outer peripheral portion and a middle section, wherein the middle section is of a translucent material, and wherein the middle section is configured to present indicia.

17. The vehicle wash system as set forth in claim 16 wherein the at least one light source further includes at least one peripheral light source positioned adjacent to and following the outer peripheral portion of the display portion and at least one central light source behind the translucent middle section.

* * * * *